United States Patent [19]

Moser

[11] Patent Number: 4,499,731
[45] Date of Patent: Feb. 19, 1985

[54] CONTROLLABLE EXHAUST GAS TURBOCHARGER

[75] Inventor: Peter Moser, Boppelsen, Switzerland

[73] Assignee: BBC Brown, Boveri & Company, Limited, Baden, Switzerland

[21] Appl. No.: 427,004

[22] Filed: Sep. 29, 1982

[30] Foreign Application Priority Data

Dec. 9, 1981 [CH] Switzerland .......................... 7858/81

[51] Int. Cl.³ .................... F02B 37/00; F01D 17/12
[52] U.S. Cl. ........................................ 60/602; 60/606; 415/157; 417/407
[58] Field of Search ............... 60/600, 601, 602, 603, 60/606; 415/157, 158; 417/407

[56] References Cited

U.S. PATENT DOCUMENTS

| 3,044,683 | 7/1962 | Woolenweber | 60/606 |
| 3,478,955 | 11/1969 | Kunderman | 415/158 |
| 4,324,526 | 4/1982 | Berchtold | 415/158 |
| 4,367,626 | 1/1983 | Schwartzman | 60/606 |
| 4,381,171 | 4/1983 | Chapple | 415/157 |

FOREIGN PATENT DOCUMENTS

| 881407 | 11/1961 | United Kingdom | 415/158 |
| 1041842 | 9/1966 | United Kingdom | 415/157 |

*Primary Examiner*—Douglas Hart
*Attorney, Agent, or Firm*—Burns, Doane, Swecker & Mathis

[57] ABSTRACT

An exhaust gas turbocharger has a movable control piston in a turbine casing. The piston is made up of a circular cylindrical body, subjected to exhaust gas pressure, or external pressure and a volute body. The volute body has substantially the cross section of the inlet volute space and adjusts the volume of the latter to the current exhaust gas flow in order to achieve optimum torque variation over the load range of the engine.

10 Claims, 9 Drawing Figures

CONTROLLABLE EXHAUST GAS TURBOCHARGER

BACKGROUND AND SUMMARY OF THE PRESENT INVENTION

This invention relates to exhaust gas turbochargers. More specifically, the present invention relates to variable intake volute geometry for gas turbochargers and control means therefor.

Particularly in the case of small turbines, for example for motor vehicle exhaust gas turbochargers, a volute entry duct is often used before the rotor blading, instead of guide equipment, because a turbine casing of this sort is less expensive to manufacture without guide equipment.

The torque of a normal supercharger turbine with constant, non-adjustable entry duct flow section falls greatly at throughputs beneath the nominal throughput for which the turbine is designed. For a given throughput, the required tangential component of the flow velocity at the wheel inlet is determined by the narrowest flow section at the beginning of the volute part of the inlet duct and its radial position, relative to the inlet diameter of the rotor. In order to achieve acceptable turbine powers in the partial load range with varying exhaust flow, proposals have been made to alter these geometrical data. In general, these proposals consist of altering the volume of the inlet volute space by movable walls to correspond to the variable exhaust gas flow.

The ASME publication "Aerodynamic Design of Fixed and Variable Geometry Nozzleless Turbine Casings" describes the possibility of altering the inlet volute space by an axially movable wall corresponding to the exhaust gas throughput. This involves the acceptance of a clearance relative to the casing inner wall. This solution is shown only schematically in the paper without any information about the adjustment equipment and the design arrangement.

Another very complex design solution with large leakage flow losses is described in the U.S. Pat. No. 2,916,198. The volume of the effective inlet volute space can, in this case, be altered by two mutually opposed half moon shaped flaps which can be swivelled about axes lying approximately tangentially to the volute periphery. The operation of the flaps is carried out by a rod situated outside the casing. It is not possible by this structure to use the exhaust gas pressure in a simple manner to adjust the flaps.

The German Offenlegungsschrift No. 2,934,041 describes an appliance for solving the present task in which the intake in the volute space is subdivided into several flutes whose cross sections, inter alia, can be altered by walls movable in the axial direction from outside. Variants of this appliance have closing elements in these flutes and the degree of opening of these elements can be adapted to the exhaust gas flow. These solutions are not satisfactory in the case of partial opening of the closing elements.

The present invention, in which at least one wall element of an exhaust gas turbine is movable along a rotor shaft axis in a cylindrical part of an inlet volute, arose from the object of creating an embodiment of a controllable turbocharger which is usable in practice and avoids the disadvantages of known solutions.

BRIEF DESCRIPTION OF THE DRAWINGS

The present invention is described in more detail below with reference to the illustrative embodiments shown schematically in the drawings. In the drawings.

DESCRIPTION OF THE PREFERRED EMBODIMENTS

Figure 1:
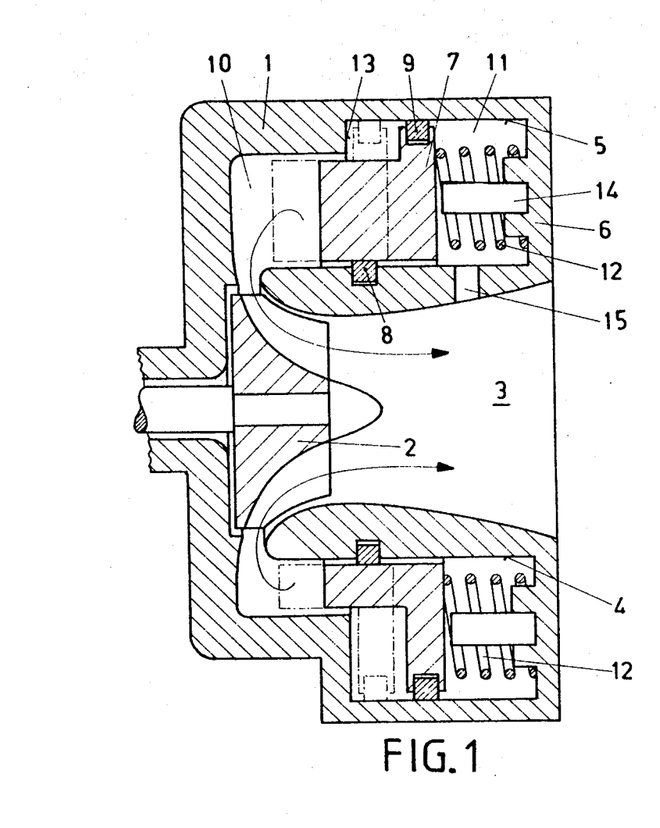
FIG. 1 is a cross-sectional view of a radial turbine of an exhaust gas turbocharger according to a first preferred embodiment of the present invention.

In FIG. 1, the turbine casing of an exhaust gas turbocharger is indicated by the numeral 1. A rotor 2 is partially surrounded by an outlet diffuser 3 having a circular cylindrical outer surface 4. Concentric with this, the turbine casing 1 has a circular cylindrical bore 5 and the circular cylindrical space between the surfaces of this bore 5 and the outer surface 4 is closed at the outlet end of the diffuser 3 by a cylinder end 6. Furthermore, this circular cylindrical space contains a control piston 7 whose precise shape and function are described below. It is sealed against the surfaces 4 and 5 by an inner piston ring 8, seated in a groove of the diffuser 3, and an outer piston ring 9, situated in a groove of the piston 7. The piston 7 separates in this way the inlet volute space 10 from a rear cylinder space 11. The full line position of the piston is the one for which the inlet volute space is a maximum whereas, in the dot-and-dash line position, it makes available the smallest volume for the exhaust gas.

The piston 7 is loaded by a series of helical compression springs 12 distributed around the periphery and these press the piston into the position of minimum volute space volume, in which the piston touches the plane end 13 of the cylindrical space. The contact pins 14 concentric with the springs 12 limit the displacement of the piston 7 in the flow direction of the turbine. The rear cylinder space 11 is connected with the diffuser space via at least one balance bore 15.

Figure 2:
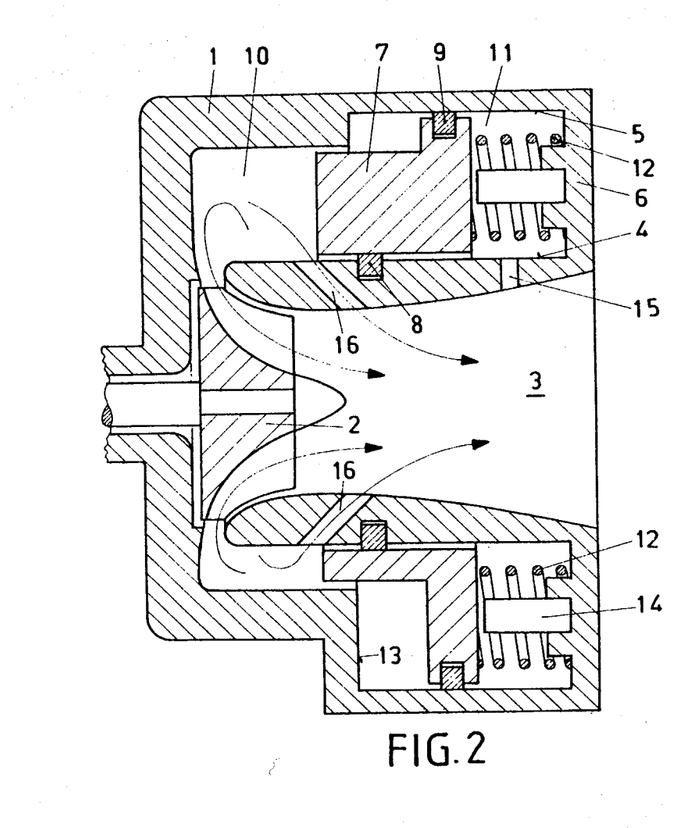
FIG. 2 is a cross-sectional view of a first modified embodiment of the turbine of FIG. 1 having an integrated waste gate.

In this embodiment and also that of FIG. 2, whose parts carry the same numbers wherever they are identical to the parts of the embodiment shown in FIG. 1, the piston 7 is pressed by the exhaust pressure in a self-regulating fashion into the position at which a sufficient pressure drop is produced for the conversion of the exhaust gas energy into mechanical energy of the rotor. The opening characteristics of the piston 7 necessary for this is obtained by appropriate dimensioning of the springs 12, which are shown as simple helical compression springs in FIGS. 1 and 2. In order to obtain desired spring characteristics, various spring types are available in practice, such as conical springs, springs with varying slope or wire thickness, weak plate springs, leaf springs and the like as well as combinations of the same.

Control pistons with piston rings, such as are preferably used, have the advantage of approximately constant friction with good sealing. However, annular diaphragms with appropriate lift fastened to the casing and the diffuser are also suitable even if their lift characteristic is more difficult to calculate in advance.

In the embodiment according to FIG. 1, the piston displacement is effected by the difference between the exhaust gas pressure in the volute space and the pressure in the diffuser 3. For the same geometrical data, this also applies to the type of construction in FIG. 2, in the diffuser 3 of which waste gate ducts 16 are provided. The piston displacement effected by a pressure difference in FIG. 2 applies to the extent that the piston 7 covers these waste gate ducts 16, i.e. while permissible exhaust pressures are still present in the inlet volute space. If the pressure is too high, the openings of the waste gate ducts 16 become free and the surplus exhaust gases flow into the diffuser. Due to the ejector effect, the pressure in the diffuser then decreases and with it the pressure in the rear cylinder space. However, since the pressure in the volute space also decreases because of the waste gate flow, the pressure difference across the piston 7 remains substantially the same.

Figure 3:
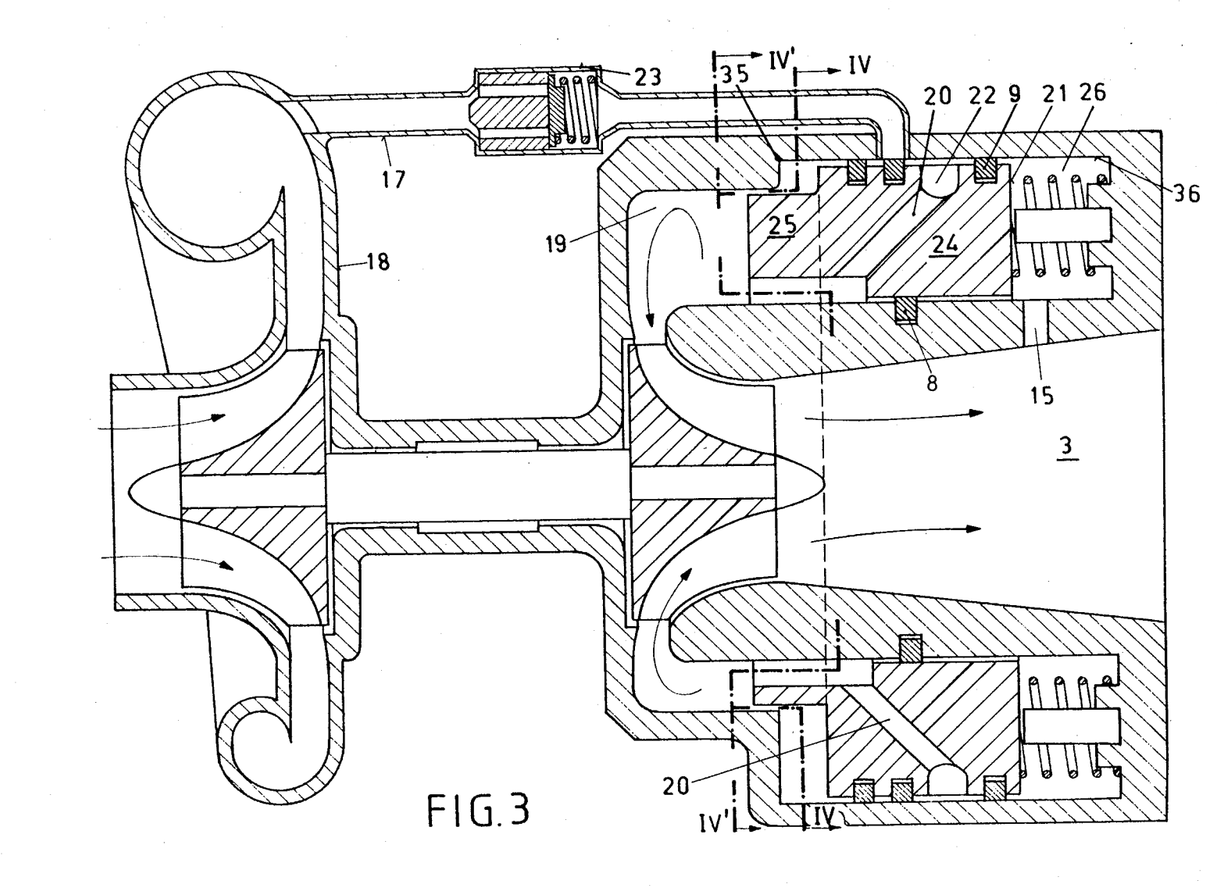
FIG. 3 is an enlarged cross-sectional view of a second preferred embodiment of the present invention with a bypass between a compressor and the tubine.

FIG. 3 shows an embodiment with a bypass pipe 17 which, at small exhaust gas flows, connects the compressor air pipe of the compressor 18 with the inlet volute space 19 via a plurality of bypass ducts 20 in a control piston 21, in order to avoid surging of the compressor. The ducts 20 communicate with an annular groove 22, with which the bypass pipe 17 is connected at low exhaust gas flows. A non-return valve 23 can be provided in the bypass pipe 17.

Figure 4:
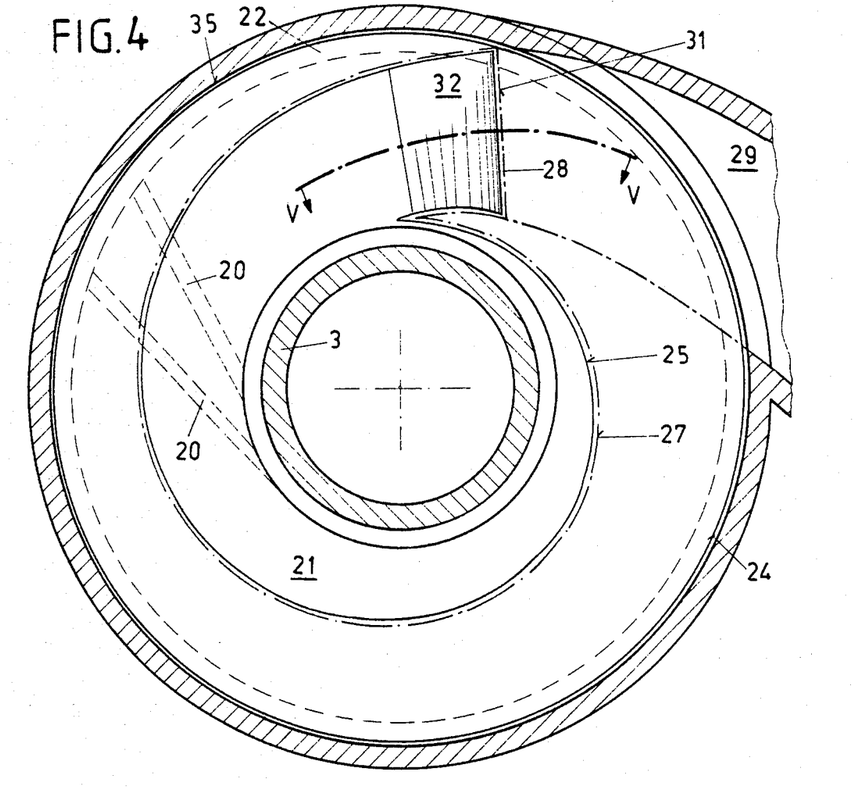
FIG. 4 is an end view of a control piston for the turbine of FIG. 3 along lines IV—IV of FIG. 3.

FIG. 4 is a cross-sectional view of the control piston 21 and the casing normal to the sections shown in FIG. 3, there being no scale association with FIG. 3. The full lines of FIG. 4 refer to the section IV—IV,, while the dot-and-dash lines show the cross section of the inner boundary of the inlet volute space 19 along the section line IV'—IV'. The section through the bypass pipe 17 is omitted as is the representation of the piston rings 9, 8 in the control piston and the diffuser 3. The annular groove 22 of the bypass and the bypass duct 20 are shown in dotted outline.

It may be seen from FIGS. 3 and 4 that the control piston 21 is made up of a circular cylindrical body 24 and a volute body 25. The circular cylindrical body 24 contain the outer piston rings 9 which, in common with the piston ring 8 in the diffuser 3 seals the inlet volute space 19 against the rear cylinder space 26. In addition, the circular cylindrical body 24 contains the annular groove 22 and the ducts 20 of the bypass, of which only two are shown in FIG. 4 to represent all the ducts distributed evenly around the periphery.

Figure 5:
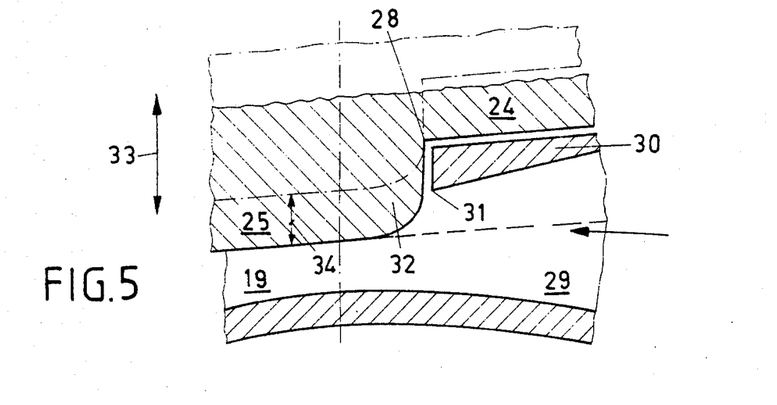
FIG. 5 is a plan view of a portion of FIG. 4, along the section line V—V shown in FIG. 4.

The section 27 of the inlet volute space 19, which is shown dash-dotted in FIG. 4 as already mentioned, runs with a small clearance parallel to the end view of the control piston as far as a sharp edged depression 28 at the transition of the volute body 25 into the circular cylindrical body 24. This depression may also of course have a larger radius. Its position may be seen from the section V—V of FIG. 4 shown in FIG. 5. The continuation of the section 27 beyond the depression 28 is the section of the inlet pipe 29. The dividing wall 30, see FIG. 5, is the result of the penetration of the inlet pipe and the inlet volute into the cylindrical casing which contains the control piston. The edge 31 of this separating wall 30 is also shown dash-dotted in FIG. 4, which is there considered cut away.

The upper run-out of the volute body 25 is formed by a rounded nose 32 so as to ensure an inlet flow with out separation of the exhaust gases from the inlet pipe 29 into the inlet volute space 19. The double arrow 33 indicates the displacement directions and the double arrow 34 the possible stroke of the control piston.

Figure 6:
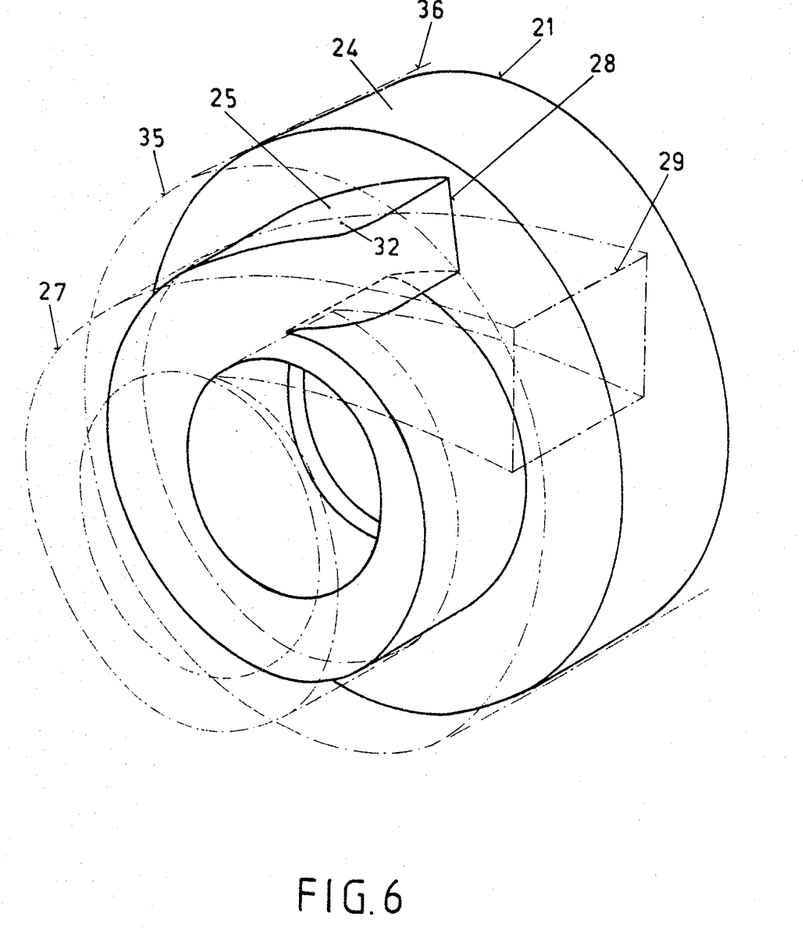
FIG. 6 is a reduced axonometric representation of the basic shape of the control piston of FIG. 4 and the boundaries of the inlet volute.

FIG. 6 shows in axonometric representation the basic shape of the control piston 21 in full lines and the basic shape of the inlet volute space in dot-and-dash lines. The shape elements have the same reference numbers as in FIGS. 4 and 5. The circle 35 is the peripheral line of the bore 36 of the casing for the control piston 21 at the transition plane into the inlet volute space 19 and has the same reference number as in FIGS. 3 and 4.

The control piston could be manufactured in one piece as a precision casting with machining required at most on the outer and inner piston running surfaces and the piston ring grooves. If the control piston is manufactured in separate parts 24 and 25, rolled and cast rod material are possibilities for the disk shaped sections of the volute body 25 and, in general, these only require machining on the plane surfaces.

Figure 7:
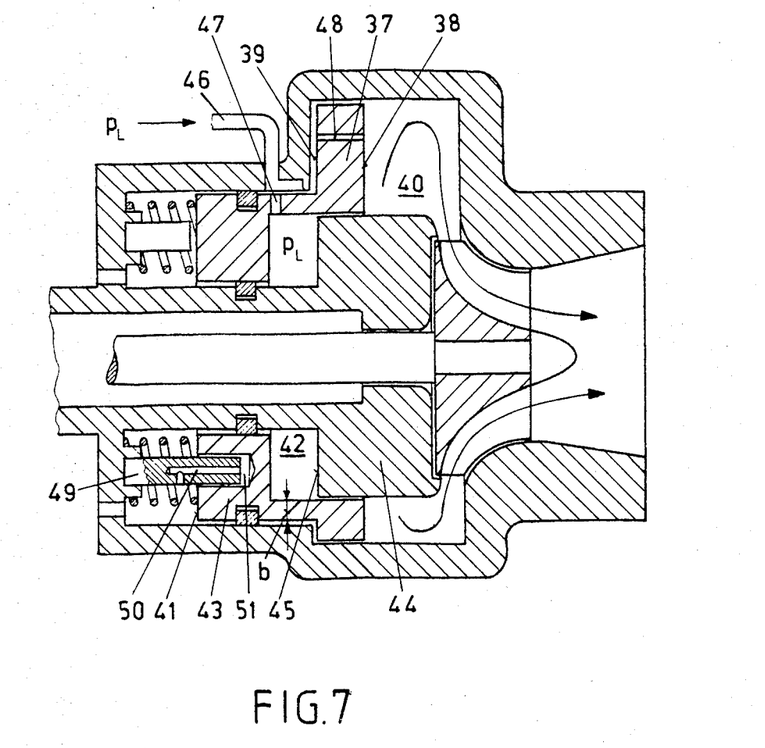
FIG. 7 is a cross-sectional view of a third preferred embodiment of the present invention illustrating a turbine similar to FIG. 1 with a control possibility using an external pressure source.

FIG. 7 shows an illustrative embodiment in which only the exhaust gas pressure corresponding to the difference between the exhaust gas, side and rear, spiral ring surfaces 38 and 39 of the volute body 37 is available for altering the cross section of the inlet volute space 40. This surface difference is the surface contained within the annular ring of width b. In this case, the main force for adjusting the control piston 41 is provided by a pressure dependent directly on the turbine power or controlled by it. In the present case, this is the boost pressure $p_L$. For this purpose, there is a connection between a cylindrical space 42 between the circular cylindrical body 43 of the control piston 41 and an end surface 45 of a bearing housing 44 and the boost air pipe. This connection is achieved via a boost air tapping pipe 46 and a radial bore 47 in the circular cylindrical body 43.

Mention should also be made of a balance bore 48 in the volute body 37, which is responsible for the reduction mentioned above of the force operating on the volute body because of the exhaust gas pressure and also of a guide pin 49 with a balance duct 50. This guide pin 49 slides in a guide bore 51 in the control piston 41 and ensures an even clearance between the volute body 37 and the casing of the inlet volute. Without such a guide, which can of course also be provided by other means, the volute body, despite the fact that it is guided in the casing of the same shape, could tip over because of the unavoidable clearance or of clearance deliberately provided for thermal expansion, and make displacement more difficult.

Figure 8:
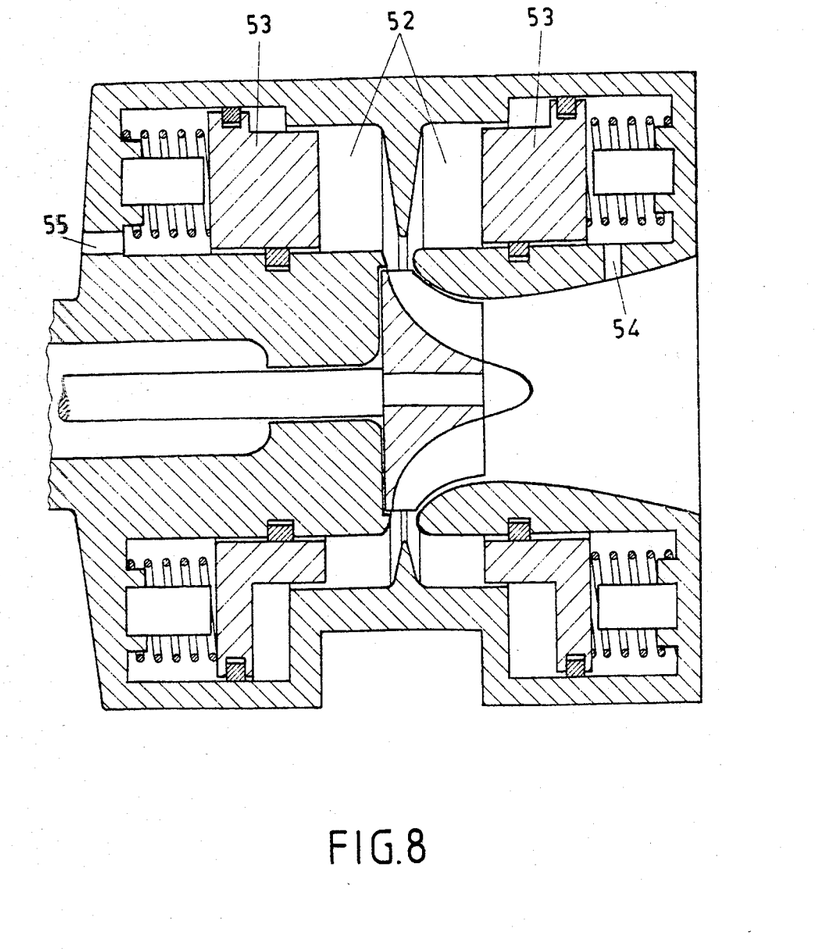
FIG. 8 is an enlarged cross-sectional view of a fourth preferred embodiment of the present invention, illustrating a turbine with a twin volute inlet.

In the turbine of an exhaust gas turbocharger shown in FIG. 8, the exhaust gas is introduced through a twin volute 52 with two mirror image inlet volute spaces. The control pistons 53, which correspond to those of FIGS. 1 and 2, are placed symmetrically about the twin volute. The balance bores 54 and 55 in the rear cylinder spaces open into the exhaust gas diffuser in the right-hand portion and into the open air in the lefthand portion.

Figure 9:
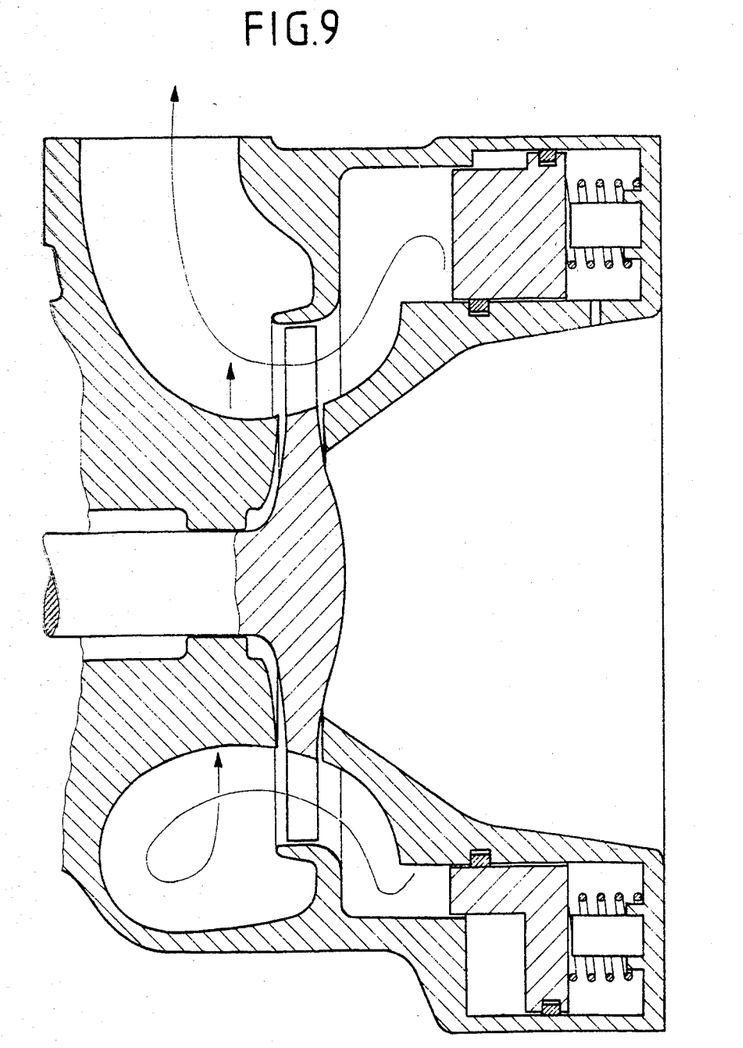
FIG. 9 is a cross-sectional view of an axial turbine embodiment of an exhaust gas turbocharger designed in accordance with the present invention.

The invention can also be applied to axial turbines, as shown in FIG. 9. The control pistons do not then differ in any way with respect to their basic shape from those for radial turbines.

Apart from the faultless sealing possibility using piston rings or a diaphragm, another particular feature of the invention is the possibility of inexpensive manufacture.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

What is claimed is:

1. An exhaust gas turbine for an exhaust gas turbocharger, comprising:
   a turbine casing surrounding the turbine wheel that is mounted on the rotor shaft and having an inlet volute space;
   wall element means movable along the rotor shaft axis in a cylindrical part of said inlet volute space, said wall element means being arranged for altering the volume and the flow cross section of the inlet volute space for the exhaust gases of the engine, said wall element means including a control piston having:
      a circular cylindrical body, which is guided in at least one circular cylindrical bore of the turbine casing, and
      a cylindrical volute body, whose cross section substantially corresponds to the cross section in the cylindrical part of the inlet volute space normal to the rotor shaft axis and is guided in this cylindrical part; and
   spring means for biasing the control piston in the direction towards the inlet volute space.

2. The exhaust gas turbine of claim 1, further comprising sealing means for sealing the control piston at the bore in the turbine casing, said sealing means including at least one external piston ring and at a circular cylindrical external surface of a turbine casing part symmetrical with the bore at least one inner piston ring, wherein the spring means are helical compression springs, and wherein balance bores are provided between a cylindrical space behind the rear side of the control piston and a source of pressure and wherein a plurality of contact pins are provided for limiting the external end position of the control piston and wherein at least one guide pin is provided for the control piston.

3. The exhaust gas turbine of claim 1, wherein a plurality of waste gate ducts are provided on the outside of an outlet diffuser of the turbocharger and wherein the waste gate ducts connect the inlet volute space with a diffuser duct.

4. The exhaust gas turbine of claim 1, wherein a first bypass duct connects the pressure side of a compressor of the turbocharger with the inlet volute space of the exhaust gas turbine, the first bypass duct opening into the bore of the control piston and an annular groove is provided in the control piston and a plurality of second bypass ducts are provided connecting said annular groove with the inlet volute space.

5. The exhaust gas turbine of claim 1, wherein the control piston is placed between a turbine of said turbocharger and a compressor of said turbocharger, said control piston being shaped in such a way that, together with a bearing housing for the turbine shaft, it bounds a cylindrical space and wherein a boost air tapping pipe is provided connecting the compression side of the compressor with the bore for the control piston and wherein a plurality of bores are provided for connecting the point where the boost air tapping pipe opens into the control piston with the cylindrical space.

6. The exhaust gas turbine of claim 1, wherein the inlet volute space is formed as a twin volute and a control piston is provided for each volute, the two control pistons being positioned symmetrically relative to the plane of symmetry of the twin volute.

7. The exhaust gas turbine of claim 1, wherein the turbine is an axial turbine.

8. The exhaust gas turbine of claim 1, wherein the turbine is a radial turbine.

9. The exhaust gas turbine of claim 2, wherein the source of pressure is an outlet diffuser.

10. The exhaust gas turbine of claim 2, wherein the source of pressure is the atmosphere.

* * * * *